(12) United States Patent
Edwards et al.

(10) Patent No.: US 6,346,325 B1
(45) Date of Patent: Feb. 12, 2002

(54) FIBER-REINFORCED COMPOSITE ENCASED IN A THERMOPLASTIC AND METHOD OF MAKING SAME

(75) Inventors: Christopher Michael Edwards, Midland, MI (US); Edward Louis D'Hooghe, Hulst (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/607,034

(22) Filed: Jun. 29, 2000

Related U.S. Application Data

(60) Provisional application No. 60/142,164, filed on Jul. 1, 1999.

(51) Int. Cl.[7] .................................................. P02G 3/00
(52) U.S. Cl. .................... 428/401; 428/292; 264/210.1; 264/290.5; 264/210.5
(58) Field of Search ................................ 428/294, 114, 428/407, 401, 292, 295; 156/166; 264/210.1, 290.5, 210.5, 211.15

(56) References Cited

U.S. PATENT DOCUMENTS

| | | | |
|---|---|---|---|
| 3,635,483 A | | 1/1972 | Barriball et al. ......... 280/11.13 |
| 3,661,887 A | | 5/1972 | Leebrick |
| 4,312,917 A | * | 1/1982 | Hawley |
| 4,439,387 A | * | 3/1984 | Hawley |
| 4,559,262 A | * | 12/1985 | Cogswell et al. ........... 428/294 |
| 5,792,529 A | * | 8/1998 | May |
| 5,891,560 A | * | 4/1999 | Edward et al. |

FOREIGN PATENT DOCUMENTS

| | | |
|---|---|---|
| WO | WO 99 01501 | 1/1999 |

* cited by examiner

*Primary Examiner*—Merrick Dixon
(74) *Attorney, Agent, or Firm*—Reid S. Willis

(57) ABSTRACT

A fiber-reinforced depolymerizable and repolymerizable thermoplastic composite that is encased in a depolymerizable and repolymerizable thermoplastic resin exhibits the strength and stiffness that make the encased composite particularly suitable for a wide array of applications that require very high strength, stiffness, and exceptional impact, together with complex shape. Examples of such applications include bumper beams, pedals, car door structures, instrument panels, and seating structures for automotive use. Other applications include window profiles, skis, ski poles, mast stays, tent poles, concrete reinforcement, crash barriers, window or door lineals, cable trays, cable for optical fibers, bicycle wheels and frames, and pipe.

14 Claims, No Drawings

FIBER-REINFORCED COMPOSITE ENCASED IN A THERMOPLASTIC AND METHOD OF MAKING SAME

CROSS-REFERENCE STATEMENT

This application claims the benefit of U.S. application Ser. No. 60/142,164, filed on Jul. 1, 1999.

BACKGROUND OF THE INVENTION

This invention relates to a fiber-reinforced composite encased in a thermoplastic, which is useful in the fabrication of large plastic parts such as automotive parts and window profiles.

At present, most automotive bumper systems consist of three basic components, a bumper beam, a bumper absorber, and a cover or facia. The bumper beam is usually metal, typically steel, since steel has the necessary strength and stiffness required for impact resistance and energy absorption. Unfortunately, steel has the disadvantage of being heavy and not easily formable to the complex shapes required to fit the styling of a car.

An alternative to steel is an injection or blow molded thermoplastic material, which is contoured to provide the facia support function. As noted in U.S. Pat. No. 5,799,991 (Glance), although this system eliminates the discrete bumper absorber, it suffers from being expensive and from having excessive impact rebound, rather than absorption during impact. Therefore, the bumper systems of the prior art fail to provide an effective, low cost, low space-consuming, and lighter weight solution to the bumper requirement problem.

Window frame profiles are typically made from wood, polyvinyl chloride, or aluminum. Although wood is rigid and aesthetically pleasing, it requires much maintenance, is inconsistent, and has availability limitations. PVC requires little or no maintenance and is readily available and consistent, but has a low modulus and high coefficient of linear thermal expansion (CLTE). Its application in window frame profiles is therefore limited to domestic windows. Aluminum, on the other hand, has a relatively low CLTE and high modulus, but it is also very thermally conductive, and requires elaborate systems to create thermal breaks to prevent significant heat loss.

In view of the deficiencies in the art, it would be desirable to discover a material that is strong and light-weight, one that has high energy absorption and high modulus, as well as low CLTE and low thermal conductivity, and one that is easy to style and shape.

SUMMARY OF THE INVENTION

The present invention addresses a need in the art by providing an encased article comprising a) a thermoplastic polyurethane composite that is reinforced with fibers that extend through the length of the composite and are at least 100 mm long; and b) a thermoplastic resin encasing the fiber-reinforced composite.

In a second aspect, the present invention is a process for preparing an encased fiber-reinforced rigid thermoplastic polyurethane composite comprising the steps of drawing a fiber bundle continuously through a melt obtained by heating a rigid thermoplastic polyurethane that contains a hydrolytically- and thermally-stable catalyst to a temperature sufficient to depolymerize the thermoplastic polyurethane; impregnating the drawn fiber bundle with the depolymerized thermoplastic polyurethane to form a composite melt; shaping the composite melt into an article; then encasing the article with a thermoplastic resin.

The present invention addresses a problem in the art by providing an overmolded fiber reinforced thermoplastic polyurethane composite that provides a light-weight and compact part suitable for a variety of applications that require very high strength, stiffness, and exceptional impact, together with complex shape.

DETAILED DESCRIPTION OF THE INVENTION

The overmolded composite of the present invention can be prepared by encasing in a thermoplastic resin a fiber-reinforced composite containing a depolymerizable and repolymerizable thermoplastic polymer (DRTP). As disclosed in U.S. Pat. No. 5,891,560 (Edwards et al.), which teachings are incorporated herein by reference, the DRTP is a thermoplastic polymer that depolymerizes upon heating and repolymerizes upon cooling.

The DRTP contains the following structural unit:

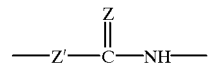

where Z is S or O, preferably O, and Z' is S, O, N-alkyl or NH, preferably O or NH, more preferably O. Preferred DRTPs are thermoplastic polyurethanes and thermoplastic polyureas, preferably thermoplastic polyurethanes (TPUs).

The DRTP is a single- or two-phase polymer that can be prepared by the reaction of approximately stoichiometric amounts of: a) a diisocyanate or a diisothiocyanate, preferably a diisocyanate; b) a low molecular weight compound (not more than 300 Daltons) having two active hydrogen groups; and c) optionally, a high molecular weight compound (molecular weight generally in the range of from about 500 to about 8000 Daltons) with two active hydrogen groups. The low molecular weight compound, in combination with the diisocyanate or diisothiocyanate, contributes to what is known as the "hard segment content", and the high molecular weight compound, in combination with the diisocyanate or diisothiocyanate, contributes to what is known as the "soft segment content".

As used herein, the term "active hydrogen group" refers to a group that reacts with an isocyanate or isothiocyanate group as shown:

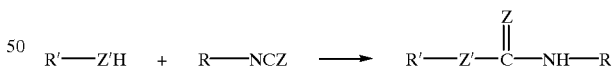

where Z and Z' are as previously defined, and R and R' are connecting groups, which may be aliphatic, aromatic, or cycloaliphatic, or combinations thereof.

The compound with two active hydrogens may be a diol, a diamine, a dithiol, a hydroxy-amine, a thiol-arnine, or a hydroxy-thiol, preferably a diol.

The DRTP may be soft or rigid, and is preferably rigid. Soft DRTP, preferably soft TPUs (STPUs) are characterized by having a Shore A hardness of not more than 95 or a glass transition temperature ($T_g$) of not more than 25° C. Rigid DRTPs, preferably rigid thermoplastic polyurethanes (RTPUs) are characterized by having $T_g$ of not less than 50° C. and typically have a hard segment content of at least 75 percent, more preferably at least 85 percent, and most preferably at least 90 percent. The disclosure and preparation of RTPUs is described, for example, by Goldwasser et al. in U.S. Pat. No. 4,376,834, which teachings are incorporated herein by reference. Such RTPUs are commercially available under the trade name ISOPLAS™ engineering thermoplastic polyurethanes (a trademark of The Dow Chemical Company).

Preferred diisocyanates include aromatic, aliphatic, and cycloaliphatic diisocyanates and combinations thereof. Representative examples of these preferred diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane.

Preferred low molecular weight compounds having two active hydrogen groups are ethylene glycol, 1,3-propanediol, 1,4-butanediol, 1,5-pentanediol, 1,6-hexanediol, diethylene glycol, triethylene glycol, tripropylene glycol, tetraethylene glycol, neopental glycol, 1,4-cyclohexanediol, 1,4-cyclohexanedimethanol, 1,4-(bishydroxyethyl)-hydroquinone, 2,2-bis($\beta$-hydroxy-4-ethoxyphenyl)propane (i.e., ethoxylated bisphenol A), and mixtures thereof. More preferred chain extenders are 1,4-butanediol, 1,6-hexanediol, 1,4-cyclohexanedimethanol, diethylene glycol, triethylene glycol, tripropylene glycol, and mixtures thereof.

The DRTP may optionally contain structural units formed from a high molecular weight compound having two active hydrogen groups, which is preferably a glycol having a molecular weight in the range of preferably not less than about 750, more preferably not less than about 1000, and most preferably not less than about 1500; and preferably not more than about 6000, and more preferably not more than about 5000. These high molecular weight glycol units constitute a sufficiently low fraction of the DRTP, preferably the RTPU, such that the $T_g$ of the DRTP is above 50° C. Preferably, the high molecular weight gllycol units constitute not more than about 25, more preferably not more than about 10, and most preferably not more than about 5 weight percent of the RTPU, to about 0 weight percent of the RTPU.

The high molecular weight glycol is preferably a polyester glycol or a polyether glycol or a combination thereof. Examples of preferred polyester glycols and polyether glycols include polycaprolactone glycol, polyoxyethylene glycol, polyoxypropylene glycol, polyoxytetramethylene glycol, polyethylene adipate, polybutylene adipate glycol, polyethylene-butylene adipate glycol, and poly(hexamethylene carbonate glycol), or combinations thereof.

The isocyanate-to-XH ratio of the reactants, preferably OH, varies from about 0.95:1, preferably from about 0.975:1, and more preferably from 0.985:1, to about 1.05:1, preferably to about 1.025:1, and more preferably to about 1.015:1.

The DRTP, preferably the RTPU, is advantageously prepared in the presence of an effective amount of a hydrolytically- and thermally-stable catalyst, which catalyzes the reaction between the isocyanate groups and the active hydrogen groups, preferably the hydroxyl groups, to form urethane, urea, or thiourea linkages, preferably urethane linkages, and remains active during the depolymerization of the polymer to catalyze the re-formation of urethane, urea, or thiourea bonds, preferably urethane bonds, and the rebuilding of molecular weight. Examples of such catalysts are $Sn^{+2}$ such as stannous octoate; and $Sn^{+4}$ catalysts such as dialkyltin dimercaptides, preferably dimethyltin dimercaptide (available as FOMREZ™ UL-22, a trademark of Witco Chemical), and dialkyltin dicarboxylates, such as those disclosed in detail in U.S. Pat. No. 3,661,887. Preferably, the catalyst is present at an amount from about 0.001 to about 5 weight percent, based on the weight of the reactants.

The composite is preferably prepared by pultrusion as described by Edwards et al., wherein a continuous fiber bundle is heated and pulled through a fiber preheat station. The fiber bundles may be composed of any of a number of different types of materials including glass, aramid fibers, carbon, ceramic, and various metals. The fiber bundle is wetted and impregnated with the thermoplastic polyurethane melt; thereafter, the impregnated bundle is shaped into the desired article, excess melt is removed, and impregnation is improved.

The pultrusion process provides a means of preparing a fiber-reinforced thermoplastic polyurethane composite having a single-ply thickness of at least 0.2 mm, preferably at least 1 mm, more preferably at least 2 mm. The fibers, which are preferably alligned substantially parallel to each other, constitute preferably at least about 30 volume percent, more preferably at least about 50 volume percent, and most preferably at least 65 volume percent of the total volume of the completed fiber-reinforced composite.

Thermoplastic resins other than DRTPs can be used in combination with the DRTP to make the fiber-reinforced composites, provided the non-DRTP is used at sufficiently low levels that the melt viscosity of the resin remains low enough to efficiently impregnate the fiber bundle. Examples of suitable ancillary resins include acrylonitrile-butadiene-styrene copolymers, polystyrenes, polyphenylene oxide, polyphenylene oxide polystyrene blends, polyoxymethylenes, polypropylene, polyamides, poly(butylene terephthalate), poly(ethylene terephthalate), polyester copolymers of poly(butylene terephthalate) and poly(ethylene terephthalate), styrene-acrylonitrile copolymers, and ethylene-propylene-diene terpolymers.

The article formed from the composite melt may be directly encased in a thermoplastic, or cooled sufficiently to rebuild molecular weight before the encasing step. As used herein, the word "encase" and variations thereof, refers to a fiber-reinforced composite which is at least partially covered by the thermoplastic. Although a process limitation is not to be inferred, the most common ways of encasing the article are overmolding and overextruding.

Thermoplastics that are especially suitable as encasing materials include those that adhere to the TPU without the need for any ancillary adhesive or mechanical interlocking. These naturally adhering thermoplastics include acrylonitrile-butadiene-styrene terpolymers (ABS), RTPU/ABS blends, acrylic-styrene-acrylonitrile terpolymers (ASA), styrene-butadiene-styrene (SBS), ethylene-styrene interpolymers (ESI), polyvinylchloride (PVC), STPU, STPU/ABS blends, polycarbonates, polycarbonate/ABS blends, polyesters such as polyethylene terephthalate and polybutylene terephthalate, polyamides such as nylon, polyphthalamides, polyether sulfones, and polyether imiides, and blends thereof and copolymers thereof. Preferred naturally adhering thermoplastics include ABS, RTPU/ABS blends, ASA, PVC, STPU, STPU/ABS blends, polycarbonates, polycarbonate/ABS blends, and polyesters.

Other thermoplastics suitable as overmolding materials that may require ancillary adhesives or mechanical interlocking include polypropylene, polyethylene, ultra high molecular weight polyethylene, polystyrene including syndiotactic polystyrene, styrene-ethylene-butadiene-styrene polymers (SEBS), aliphatic polyketones, acetal, and polyphenylene sulfide, and blends thereof.

Encasing of a thermoplastic material can be carried out by injection molding or extrusion methods well known in the art. For example, in an injection molding method, the fiber-reinforced composite is first formed into its desired shape. The shaped composite is either maintained hot, or allowed to cool, then placed and positioned into the cavity of an injection molding tool, where the hot thermoplastic melt is introduced into a cavity of the tool. The melt is left to cool down until the overmolded part can be ejected from the tool without distortion. In an extrusion method, the shaped composite can be transferred into a die similar to a wire-coating die, and the thermoplastic overmolding material can be extruded around the shaped composite.

If pultrusion and overextrusion is done in a continuous on-line process, heat from the pultrusion process is preferably retained in the shaped composite to enhance the adhesion of the profile and the overmolded or overextruded thermoplastic resin. An example where overextrusion is useful is in the field of fabrication of window profiles where the thermoplastic composite is overextruded with PVC. The overextruded window section has relatively high strength and stiffness and a low CLTE.

Because DRTPs, particularly RTPUs, depolymerize at advanced temperatures and repolymerize upon cooling, fiber-reinforced composites made from these thermoplastics have superior physical properties as compared to fiber reinforced composites based on thermoplastics that are not depolymerizable and repolymerizable. Moreover, upon thermoforming, these fiber-reinforced composites substantially retain the properties of the pre-thermoformed part. Additionally, freedom of design of parts is enhanced.

Surprisingly, fiber-reinforced composites encased in a thermoplastic have exceptionally desirable physical properties and are especially useful in applications where light weight, and high strength, stiffness, and energy absorption are required. Thus, for bumper beam applications, the composite provides the overall stiffness and strength, while the overmolding provides shape, styling, and other necessary design features. For window frame profiles, the composite provides high modulus, low CLTE, consistency, low thermal conduction, and low cost.

Other examples of automotive applications include car door structures, automotive pedals, automotive instrument panels, and seating structures. The encased reinforced composites of the present invention can be used in a wide array of applications that require very high strength and stiffness, and exceptional impact, together with complex shape. Examples of other applications include skis, ski poles, mast stays, tent poles, concrete reinforcement, crash barriers, window or door lineals, cable trays, cable for optical fibers, bicycle wheels and frames, and pipe.

The following example is for illustrative purposes only and is not intended to limit the scope of this invention.

EXAMPLE 1

Preparation of a Fiber-reinforced Composite Overextruded with PVC

A. Preparation of Glass Fibers Impregnated with a Rigid Thermoplastic Polyurethane (Part A incorporates by reference FIG. 1 of U.S. Pat. No. 5,891,560 as well as references to the figure.)

Twenty-four tows of fiber (Owens Corning, R43S, 2400 tex) arranged in 3 layers, are pulled through the preheat station at 240° C. ISOPLAST™ 2530 polyurethane engineering thermoplastic resin (a trademark of The Dow Chemical Company) which is predried at 95° C. for over 8 hours on a Piovan dehumidifying dryer and processed on a Collins single-screw extruder (screw speed 25 rpm, barrel zone temperatures 250° C. (hopper), 260° C., and 270° C.). The connector is set at 280° C. Each layer of fibers is pulled through an impregnation pin, where the fibers are saturated with the polyurethane melt, then weaved through several heated rods. The impregnation pins each have a slot dimension that is 0.8 mm high and 60 mm wide, and a first channel length of 120 mm and a channel diameter of 30 mm. The impregnation pins are maintained at 285° C., and the other rods are maintained at 260° C. Fibers are pulled at a rate of 2 m/min. Strips having a dimension of 2 cm wide by 2 mm thick (and of variable length) are produced. The flexural strength of fiber-reinforced composite is 1300 MPa, and flex modulus is 41 GPa (testing according to BS 2787).

B. Overextruding of the Fiber-reinforced Composite

The strips prepared in part A are overextruded with PVC as follows. The pultruded strips are fed through a cross head extrusion die to produce a PVC hollow square box-shaped article (25×25 mm) with wall thicknesses of 4 mm. The set point temperatures for the PVC extruder used in the online production of the reinforcement strip are 150° C., 155° C., 160° C., 165° C., 170° C., and 175° C. The set point temperature of the extrusion die is 175° C.–180° C.

EXAMPLE 2

Preparation of a Fiber-reinforced Composite Overmolded with TPU

Strips prepared as in Example 1A Samples are overmolded with a soft TPU as follows. A shaped article of the fiber-reinforced composite strip is cut to a reduced shape to fit snugly into the cavity of a tool for a typical dogbone shaped tensile bar. The cut strip is placed into the cavity of the moving half and is held in place by friction. A hot melt of 75 Shore A hardness TPU is introduced through the injection molding barrel into the mold. The part is allowed to cool and is then ejected from the tool. This overmolded fiber-reinforced part provides a soft touch finish to a stiff tensile bar.

What is claimed is:

1. An encased article comprising a) a depolymerizable, repolymerizable thermoplastic polymer composite that is reinforced with fibers that extend through the length of the composite and are at least 100 mm long; and b) a thermoplastic resin encasing the fiber-reinforced composite, wherein the depolymerizable, repolymerizable thermoplastic polymer contains structural units represented by the formula:

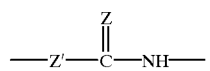

where Z is S or O; and Z' is S, O, N-alkyl or NH.

2. The encased article of claim 1 wherein the fibers constitute at least 30 volume percent of the fiber-reinforced composite, and the depolymerizable, repolymerizable polymer is a thermoplastic polyurethane.

3. The encased article of claim 2 wherein the fibers constitute at least 50 volume percent of the fiber-reinforced composite and the thermoplastic polyurethane is a rigid thermoplastic polyurethane.

4. The encased article of claim 2 wherein the thermoplastic resin adheres to the fiber-reinforced composite without an ancillary adhesive.

5. The encased article of claim 4 wherein the thermoplastic resin is an ABS terpolymer, an RTPU, an RTPU/ABS blend, an ASA, a PVC, an STPU, an STPU/ABS blend, a polycarbonate, a polycarbonate/ABS blend, a polyester, a polyamide, or copolymers thereof or blends thereof.

6. The encased article of claim 3 wherein the fiber-reinforced composite is encased in a polypropylene, a polyethylene, an ultra high molecular weight polyethylene, a polystyrene, an SBS, an ESI, and SEBS, an aliphatic polyketone, an acetal, or a polyphenylene sulfide, or copolymers thereof or blends thereof.

7. The encased article of claim 6 wherein the fiber-reinforced composite is encased in the presence of an ancillary adhesive or with mechanical bonding or a combination thereof.

8. The encased article of claim 1 which is an automotive bumper beam, a pedal, a car door structure, an instrument panel, a seating structure, a window profile, a ski, a ski pole, a mast stay, a tent pole, a crash barrier, a window lineal, a door lineal, a cable tray, an optical fiber cable, a bicycle wheel, a bicycle frame, or a pipe.

9. A process for preparing a fiber-reinforced rigid thermoplastic polyurethane composite article encased in a thermoplastic comprising the steps of drawing a fiber bundle continuously through a melt obtained by heating a rigid thermoplastic polyurethane that contains a hydrolytically- and thermally-stable catalyst to a temperature sufficient to depolymerize the thermoplastic polyurethane; impregnating the drawn fiber bundle with the depolymerized thermoplastic polyurethane to form a composite melt; shaping the composite melt into an article; then encasing the article with a thermoplastic resin.

10. The process of claim 9 wherein the thermoplastic resin is an ABS terpolymer, an RTPU, an RTPU/ABS blend, an ASA, a PVC, an STPU, an STPU/ABS blend, a polycarbonate, a polycarbonate/ABS blend, a polyester, or a polyamide or copolymers thereof or blends thereof.

11. The process of claim 10 wherein the thermoplastic resin is an ABS terpolymer, a PVC, an STPU, or an RTPU/ABS blend.

12. The process of claim 9 wherein the thermoplastic resin is overmolded onto the fiber-reinforced composite.

13. The process of claim 9 wherein the thermoplastic resin is overextruded onto the fiber-reinforced composite.

14. The process of claim 9 wherein the article is cooled sufficiently to rebuild molecular weight before it is encased with the thermoplastic resin.

* * * * *